United States Patent Office 3,639,459
Patented Feb. 1, 1972

3,639,459
METHOD OF PREPARING POLYMERIZABLE MONOMERIC ESTERS
Joseph S. Nissan, Watertown, Mass., assignor to Polaroid Corporation, Cambridge, Mass.
No Drawing. Filed Apr. 24, 1968, Ser. No. 723,890
Int. Cl. C07c 69/54
U.S. Cl. 260—486 R
10 Claims

ABSTRACT OF THE DISCLOSURE

Monomeric diesters of glycols and $\alpha,\beta$-unsaturated carboxylic acids are prepared by reacting the glycol and an excess of acid in a solvent-free system in the presence of an acid catalyst and polymerization inhibitor at a temperature not exceeding about half the boiling point of the acid. The crude reaction product obtained is neutralized and purified by treatment with a relatively concentrated aqueous solution of an alkali metal hydroxide.

---

This invention relates to an improved method of preparing monomeric unsaturated diesters of glycols and, more particularly, to the preparation of such esters of $\alpha,\beta$-unsaturated carboxylic acids.

Conventional processes for the production of these esters involve the direct esterification of the glycol with the unsaturated acid. The reaction is generally carried out in the presence of an acid catalyst and with the aid of an inhibitor to preclude the occurrence of polymers of the unsaturated reactant, the ester product or both. Also, it is customary to conduct the reaction in the presence of an organic solvent, such as benzene or heptane, which forms an azeotrope with the water of reaction to facilitate its removal as esterification proceeds.

Despite the presence of inhibitor, varying amounts of polymeric by-products are ordinarily obtained in conventional esterification processes. This is due in large measure to the high reaction temperatures that are customarily employed. As a result of polymer formation, esterification tends to be incomplete so that the crude reaction product, besides containing polymeric by-products, contains substantial amounts of unreacted and/or partially reacted glycol. The high and similar molecular weights of the unreacted and partially reacted materials as compared to those of the desired diester products make distillation a difficult and somewhat impractical procedure for product recovery. Similarly, the polymeric by-products often form stable emulsions upon neutralization of the crude reaction product, making product recovery by aqueous extraction impractical without resorting to addition separation techniques. The presence of unreacted glycol in the crude reaction product also interferes with product recovery using aqueous extraction since the glycol tends to increase the water solubility of the diester.

Another disadvantage of conventional methods of producing esters resides in the use of a solvent. Besides the care and watchfulness necessitated by the inherent danger in using a solvent in high temperature processes, complete removal of solvent from the product is practically impossible to achieve. Invariably, the product contains traces of solvent regardless of the distillation or combination of distillation techniques used for its removal. Because the level of residual solvent tends to vary from batch to batch, the overall utility of the product may be limited, especially in applications where concentrations of solvent above a certain level cannot be tolerated. Moreover, some polymerization of the product is difficult to avoid during distillation even when the maximum permissible amount of inhibitor is used.

It is therefore the main object of the present invention to provide a method of producing unsaturated diesters of glycols which is free from many of the disadvantages associated with prior methods.

Other objects of the invention will in part be obvious and will in part appear hereinafter.

The invention accordingly comprises the method involving the several steps and the relation and order of one or more of such steps with respect to each of the others, which will be exemplified in the following detailed disclosure, and the scope of the application of which will be indicated in the claims.

According to the present invention, unsaturated diesters of glycols of improved quality are produced in excellent yields by contacting, in the absence of solvent, a mixture of polyalkylene glycol and an excess of $\alpha,\beta$-unsaturated carboxylic acid with an acid esterification catalyst in the presence of a polymerization inhibitor at a temperature not exceeding about one-half the boiling point of the unsaturated acid while simultaneously removing the water of esterification at a constant rate and thereafter purifying the crude reaction mixture, also in the absence of a solvent, by aqueous extraction with a relatively concentrated solution of an alkali metal hydroxide at a temperature not exceeding about 20° C.

By conducting the esterification reaction at relatively low temperatures, as compared to those normally employed, little or no polymer by-product is formed and the amount of unreacted or partially reacted glycol is kept at a minimum. Since only negligible amounts of such contaminants are present in the crude reaction product, subsequent recovery and purification of diester may be achieved using aqueous extraction techniques without the undesirable formation of stable emulsions and without any significant loss of diester due to an increase in its solubility. By conducting both esterification and purification in the absence of a solvent, the problems of residual solvent in the product, of distilling the reaction product in addition to aqueous extraction to remove solvent and the loss of monomeric diester due to polymerization during distillation are obviated. Also, the absence of solvent permits the use of increased quantities of starting materials per batch and permits recovery of the excess acid reactant ordinarily lost in prior solvent methods, since in the present method the acid is used as the azeotroping agent for the water and may be readily recovered from the constant boiling mixture collected during the esterification reaction.

Another advantage of the present invention is that purification of the diester may be achieved rapidly and without any significant loss of product due to hydrolysis. A further advantage is that washing of the diester with water after aqueous extraction with the alkali solution is not required. After one treatment with a relatively concentrated solution of an alkali metal hydroxide, the separated diester layer is substantially free from contaminants, usually contains less than 0.5% by weight water and is neutral in spite of its contact with strong alkali. A still further advantage of the present invention is that the alkali solution in the amounts used for purifying the diester product also neutralizes the crude reaction product so that neutralization and purification may be accomplished in a single step. Also, by conducting both the esterification and purification steps in the absence of a solvent it is possible to produce a diester for applications where the use of a solvent-free product is essential.

The term "solvent" as used herein refers to the inert organic liquids conventionally used in esterification reactions as azeotroping agents for the water and to the inert organic liquids used in solvent extractions for recovering the ester product from the crude reaction mixture. Ordinarily, the organic liquids employed for azeotroping the water of esterification are essentially non-polar organic solvents or diluents such as benzene, hexane, heptane, toluene, xylene, cyclohexane and trichloroethylene. The inert organic liquids used as ester product extracting solvents are generally polar organic solvents such as trichloroethane and isoamyl alcohol but may be non-polar or substantially non-polar organic solvents, such as benzene.

For a fuller understanding of the nature and objects of the present invention, reference should be had to the following detailed description.

In carrying out the method of the present invention, polyalkylene glycol and an excess of $\alpha,\beta$-unsaturated acid are charged to a suitable reactor together with the acid esterfiication catalyst and a polymerization inhibitor. The charge is then heated to the desired reaction temperature not exceeding about one-half the boiling point of the unsaturated acid and a vacuum is applied to remove the water of esterification as a constant boiling mixture with the excess acid reactant. After the charge has been brought up to the desired reaction temperature, the reaction is set on total reflux, and the temperature and rate of distillation of water/acid azeotrope are maintained constant until esterification is complete, i.e., until substantially all of the glycol has reacted with the unsaturated acid. The crude reaction product is then purified by aqueous extraction with a solution of an alkali metal hydroxide at a temperature not exceeding about 20° C. The alkali is added with gentle stirring, and gentle agitation of the mixture is continued for a suitable time after which the diester and aqueous layers are allowed to separate. The lower aqueous layer containing some monoester, some unreacted acid, catalyst, inhibitor and other contaminants is then drawn off and discarded, leaving a layer of substantially pure diester product which may be dried over magnesium sulfate or other dehydrating agent, if necessary or desired.

The glycol reactant used in the present invention may be any polyethylene glycol having two free, reactive hydroxyl groups including mixtures of such glycols. The more commonly encountered and readily available glycols are "straight" polyethylene glycols which have the free, reactive hydroxyl groups at each of their terminal ends. Preferably, the polyethylene glycol comprises three to five alkylene groups wherein the alkylene groups comprise two to three carbon atoms and preferably two carbon atoms. Illustrative of suitable glycols are diethylene glycol, triethylene glycol, tetraethylene glycol, pentaethylene glycol and the corresponding propylene glycols. Particularly useful mixtures of glycols are those designated polyethylene glycol 200, polyethylene glycol 300 and polyethylene glycol 400 wherein the numbers 200, 300 and 400 refer to the average molecular weight of the glycol mixture. Ordinarily, the glycol reactant employed has a molecular weight not greater than about 600.

The unsaturated acid reactant used in the present method may be any $\alpha,\beta$-unsaturated monocarboxylic acid. Examples of unsaturated acids particularly suitable for use in preparing the diesters are acrylic acid (boiling point 141.9° C.) and substituted acrylic acids, such as alkyl- and halogen-substituted acrylic acids, e.g., methacrylic acid (boiling point 163° C.), $\alpha$-ethylacrylic acid, crotonic acid (boiling point 189° C.), tiglic acid (boiling point 198.5° C.) and $\alpha$-chloroacrylic acid (boiling point 176° C.).

To ensure complete esterification and effective removal of water, the unsaturated acid reactant is used in amounts in excess of stoichiometric requirements, i.e., in excess of the amount necessary to react with the free, reactive hydroxyl groups of the glycol. It is generally used in an excess of at least 10 mole percent over stoichiometric requirements and usually in an excess of between about 10 and 30 mole percent over the stoichiometric amount.

As the esterification catalyst, there may be employed any strong mineral or organic acid having a high dissociation constant as conventionally used in the art. Examples of suitable strong acid catalysts are p-toluene sulfonic acid, benzenesulfonic acid, sulfuric acid and phosphoric acid. While the precise quantity of catalyst may vary, the amount employed is generally between about 2 and 4 percent by weight, based on the weight of glycol starting material. Concentrations of less than about 2 percent by weight of catalyst tend to result in slow reaction rates while the use of concentrations greater than about 4 percent by weight of catalyst frequently engender the formation of undesirable by-products, such as tars, in the crude reaction product.

In the present method, any polymerization inhibitor as commonly used in esterification reactions may be employed. Suitable inhibitors include organic inhibitors such as hydroquinone and the various phenolic compounds, e.g., p-benzylaminophenol. Also suitable are inorganic inhibitors such as copper salts in cupric form, e.g., cupric acetate and cupric sulfate. The quantity of inhibitor will vary according to the particular compound employed. Copper salt inhibitors are usually employed in quantities between about 1 and 4 percent by weight of copper in the salt, based on the weight of glycol starting material. Organic inhibitors, such as hydroquinone, are generally utilized in an amount between about 0.25 and 2.5 percent by weight based on the weight of glycol.

As indicated above, the reaction temperature during esterification should not exceed about one-half the temperature at which the unsaturated acid boils because of the tendency of the ester product and especially of the unsaturated acid reactant to polymerize at high temperatures. Carrying out the esterification at a temperature of about one-half the boiling point of the unsaturated acid or less (within about 20° C. below one-half the boiling point) ensures a polymer-free product as well as high reaction rates and substantial conversions within a reasonable time.

To obtain a smooth reaction, the vacuum applied during esterification should be sufficient to remove the water/unsaturated acid azeotrope at a constant rate. The particular vacuum applied for achieving these results may vary somewhat according to the equipment employed and other factors. Ordinarily, however, the vacuum initially applied is low, e.g., the order of 100 millimeters Hg so as to prevent distillation of the acid reactant before it begins to react with the glycol. Since the flow of distillate usually decreases as the reaction continues, the vacuum is gradually increased to about 5 millimeters Hg or lower in order to maintain a steady flow of distillate until substantially all of the acid has reacted with the glycol. When the flow of distillate finally ceases at an applied vacuum in the neighborhood of 5 millimeters Hg, the reaction is substantially complete. The resulting crude reaction product comprises the diester together with the catalyst, inhibitor and usually small amounts of monoester, unsaturated acid reactant and incidental impurities.

In purifying the crude reaction product, it is desirable to carry out the aqueous extraction at a temperature not exceeding about 20° C. so as to prevent loss of diester through hydrolysis. A temperature of between about 10° C. and 20° C. has been found satisfactory for the purification step with a temperature of about 15° C. being preferred. To allow for the heat generated by the addition of the alkali solution, it has been found convenient to cool both the alkali solution and the crude reaction product before they are admixed. Generally, the temperature to which they are cooled is sufficiently low to prevent the temperature of the mixture from exceeding about 20° C. upon addition of the alkali solution. Cooling to a temperature between about 0° C. and —20° C. is usually satisfactory for this purpose, though the particular temperatures to which the alkali solution and reaction product are cooled will vary somewhat according to the concentration of alkali metal hydroxide. If desired, purification may be conducted in a vessel provided with cooling means to ensure that the temperature during aqueous extraction does not exceed the desired maximum.

During addition and mixing of the alkali solution with the crude reaction product, agitation should be sufficient to thoroughly disperse the solution in the diester layer without causing emulsion formation. For achieving these results, agitation is usually maintained in the neighborhood of 30 to 40 r.p.m. during addition of the alkali solution and is subsequently reduced and maintained at about 5 to 10 r.p.m. for a suitable time after which the aqueous and diester layers are allowed to separate.

The time of contact of the alkali solution with the crude reaction product will vary depending on such factors as the concentration of alkali metal hydroxide in the aqueous solution and the rate of hydrolysis of the particular diester product at the purification temperature employed. The time of contact should be balanced with these factors so that there will be little and preferably no loss of product due to hydrolysis. Ordinarily, the mixture of reaction product and alkali solution is gently agitated for about ½ hour to 1 hour after the alkali has been added. Thereafter, agitation is discontinued and the diester and aqueous layers are allowed to separate for a time in the vicinity of ½ to 1 hour.

The alkali solution used in the purification of the crude reaction product is preferably an aqueous solution of sodium hydroxide but may be an aqueous solution of another alkali metal hydroxide, e.g., potassium hydroxide or mixtures of alkali metal hydroxides. To obtain satisfactory extraction of impurities and rapid separation of the aqueous and diester layers, the concentration of alkali metal hydroxide should range between about 20% and 30% by weight and preferably is about 25% by weight. Solutions having concentrations below about 20% by weight of alkali metal hydroxide tend to form emulsions with the crude reaction product which break only partially and very slowly, while solutions having concentrations greater than 30% by weight of alkali metal hydroxide tend to cause hydrolysis of the product even at low temperatures.

The quantity of alkali solution used in treating the crude reaction product may vary over a relatively wide range. Quantities of alkali solution ranging between about 25% and 35% by weight as based on the weight of crude reaction product have been found satisfactory for obtaining the diester product in substantially pure form after a single extraction with the aqueous alkali. Though the diester product may be given more than one wash treatment with alkali solution and may also be washed one or more times with water, it is preferred to achieve substantially complete removal of impurities upon one extraction with the alkali solution. Loss of diester due to hydrolysis is more apt to occur upon additional treatments with alkali while washing with water has the disadvantage of making the diester more susceptible to oxidation and polymerization during storage.

The present invention will be further illustrated by, but is not intended to be limited to, the following example.

EXAMPLE 780 kilograms of polyethylene glycol having an average molecular weight of about 200 was charged to a 500 gallon jacketed, stainless steel reactor equipped with a vacuum distillation unit, a variable speed agitator and a temperature indicator and recorder. Thereafter, 12 kilograms of hydroquinone, 794 kilograms of methacrylic acid and 22.5 kilograms of concentrated sulfuric acid were added to the reactor with agitation at about 120 r.p.m. Bubbling of air was then commenced through the charged ingredients in the reactor. At the same time, heat was uniformly applied to the reaction mass by supplying and circulating tempered water set at 70° C. to the jacket of the reactor, and a vacuum of approximately 100 mm. Hg was applied to the distillation unit. The reaction was set on total reflux and agitation continued. After about 45 minutes, the reaction mass had reached a temperature of 70° C. The reaction mass was maintained at this temperature for the remainder of the reaction and a steady rate of distillation of about 7 litres per hour was established by gradually increasing the vacuum to 70-80 mm. Hg. The vacuum was further increased to about 5-10 mm. Hg as the reaction proceeded in order to maintain the steady flow of distillate. When no more distillate was obtained at a vacuum of about 5 mm. Hg, heat was discontinued and the reaction mass was cooled to −10° C. to −15° C. by replacing the tempered water in the jacket with glycol coolant. The time required for esterification was approximately 20 hours. Cooling of the reaction mass to about −10° C. required approximately 2 hours.

To the chilled crude reaction product there was added 450 kilograms of 25% by weight aqueous sodium hydroxide solution which had been cooled to 0° C. to −5° C. The alkali solution was added rapidly in about 10 minutes with stirring at about 40 r.p.m. After addition of alkali solution was complete, agitation at 40 r.p.m. was continued for about 5 minutes and then reduced to 8–10 r.p.m. Agitation at the lower speed was continued for about 30 minutes and then stopped to allow the aqueous and diester layers to separate. During treatment with the aqueous solution, glycol cooling was employed to keep the temperature of the mixture below about 20° C. The temperature at the time the layers were allowed to separate was 15° C. to 16° C.

After the layers had separated, which required 30 to 45 minutes, the lower aqueous layer containing the sodium hydroxide, sodium methacrylate, sodium salts of hydroquinone, sulfuric acid and mono-substituted glycol ester and an aqueous solution of incidental impurities was drawn off and discarded. The upper layer comprising the substantially pure monomeric diester of polyalkylene glycol 200 and methacrylic acid was cooled to 0° C. to −5° C. and maintained at this temperature during subsequent treatment with desiccant.

To remove residual water, which amounted to less than 0.5% weight of isolated product, approximately 5 kilograms of magnesium sulfate was added to the diester product with stirring. After the magnesium sulfate had been thoroughly dispersed in the diester, additional desiccant, about 4 kilograms, was slowly added with agitation until the diester product began to turn cloudy. At this point, agitation was discontinued and the diester layer was allowed to separate fully, leaving a sludge of magnesium sulfate at the bottom of the reactor. The clear diester layer was then carefully decanted and transferred to a glass-lined vessel equipped to maintain the temperature of the diester at 0° C. to −5° C. and to gently agitate the diester at 5 to 10 r.p.m. Finally, the diester product was filtered via gravity into suitable containers for storage. The quantity of crystal clear diester product recovered was approximately 1,000 kilograms.

As will be apparent to those skilled in the art, certain changes may be made in the above procedure while still achieving the benefits of the present invention. For example, oxygen rather than air may be bubbled through the reaction mass to ensure maximum effectiveness of the hydroquinone inhibitor. Other polymerization inhibitors and/or other acid esterification catalysts as conventionally used in the art, whether organic or inorganic in nature, may be employed. When polymerization inhibitors such as copper salts are used, the aqueous alkaline solution used in the purification step may contain a copper precipitating compound. Also, the desiccant employed to remove residual water from the diester product may be silica gel or other suitable material.

Results similar to those obtained above may be achieved in the preparation and recovery of other polymerizable monomeric diesters. Typical of the diesters that may be produced according to the present method are diethylene glycol dimethacrylate, triethylene glycol dimethacrylate, tetraethylene glycol dimethacrylate, dipropylene glycol dimethacrylate, tripropylene glycol dimethacrylate, the corresponding diesters of acrylic acid and of other substituted acrylic acids and polymethylene glycol diacrylates and dimethacrylates. Other diesters that may be produced are glycol diacrylates made from a mixture of polyalkylene glycols, e.g., polyethylene glycols having an average molecular weight of 200 or above.

When prepared in accordance with the present invention, these monomeric diesters may be readily converted to polymers in the presence of peroxides or other well-known polymerization catalysts employing bulk, aqueous emulsion or dispersion, or solution polymerization techniques. Accordingly, the polymerizable monomeric diesters find utility in the manufacture of castings of various shapes, as impregnating and laminating compositions, as surface coating compositions and in the preparation of polymeric sheets, tubes, rods and in other applications which will be readily apparent to those skilled in the art.

The monomeric diesters produced according to the present method are particularly useful in the manufacture of articles having high surface hardness and scratch resistance by subjecting the catalyzed monomer composition to polymerizing conditions in situ. As an illustration of such utility, the diester of methacrylic acid and polyalkylene glycol 200 obtained in the above example was used to coat plastic sheet material for subsequent use in the fabrication of optical elements, such as lenses and filters, according to the method described and claimed in U.S. Patent No. 3,097,106 issued July 9, 1963 to Elkan R. Blout et al. It was found that the polymerized diester formed a highly satisfactory mar-resistant surface which greatly extended the useful life of the optical elements fabricated from the coated plastic sheet.

It will be apparent that certain other modifications in the present invention are possible without departing from the scope thereof. The diester product prepared according to the esterification step of the present invention may be purified other than by the above aqueous extraction step. In the manufacture of castings and other applications where it is intended to use the diester product in solvent solution, the diester product produced according to the esterification step of the present invention may be purified by conventional solvent extraction techniques if so desired. Alternatively, monomeric diester product prepared in accordance with the esterification and purification steps of the present method may be dissolved in a suitable organic solvent to provide a solution free from polymer by-products. However, by utilizing both the esterification and purification procedures of the present invention, a monomeric diester substantially free from impurities may be obtained which is suitable for an endless variety of uses, including those where even traces of solvent in the product is a distinct disadvantage.

Since certain changes may be made in the above method without departing from the scope of the invention herein involved, it is intended that all matter contained in the above description shall be interpreted as illustrative and not in a limiting sense.

What is claimed is:

1. A method of preparing polymerizable monomeric diesters of glycols which comprises contacting in the absence of a solvent, a mixture of a polyalkylene glycol having two free, reactive hydroxyl groups and having two to five alkylene groups, each alkylene group containing two to three carbon atoms, and an excess of at least 10 mole percent over the stoichiometric amount of an $\alpha,\beta$-unsaturated monocarboxylic acid selected from acrylic acid, alkyl-substituted acrylic acids and halogen-substituted acrylic acids with an acid esterification catalyst in the presence of a polymerization inhibitor at a temperature not exceeding about on-half the boiling point of the unsaturated acid while continuously removing water of esterification at a constant rate until substantially all of said glycol has reacted with said unsaturated acid.

2. A method according to claim 1 wherein said temperature is between about one-half the boiling point of the acid and about 20° C. below one-half the boiling point of the acid.

3. A method according to claim 1 wherein said excess of unsaturated acid is between about 10 and 30 mole percent over the stoichiometric amount.

4. A method according to claim 1 wherein said glycol is polyethylene glycol.

5. A method according to claim 1 wherein said acid is methacrylic acid.

6. A method according to claim 1 which comprises the additional step of purifying the reaction mixture in the absence of a solvent at a temperature not exceeding about 20° C. by extraction with an aqueous solution of alkali metal hydroxide, said solution containing between about 20% and 30% by weight of said hydroxide.

7. A method according to claim 6 wherein said purifying temperature is between about 10° C. and 20° C.

8. A method according to claim 6 wherein said alkali metal hydroxide is sodium hydroxide.

9. A method according to claim 6 wherein said glycol is polyethylene glycol and said unsaturated acid is methacrylic acid.

10. A method according to claim 9 wherein said glycol is polyethylene glycol having an average molecular weight of approximately 200.

References Cited

UNITED STATES PATENTS

| | | | |
|---|---|---|---|
| 2,129,694 | 9/1938 | Izard | 260—486 X |
| 2,129,722 | 9/1938 | Woodhouse | 260—486 X |
| 2,891,990 | 6/1959 | Mulvany et al. | 260—486 |
| 2,996,538 | 8/1961 | Van Dijk | 260—486 |

LORRAINE A. WEINBERGER, Primary Examiner

P. J. KILLOS, Assistant Examiner

U.S. Cl. X.R.

117—138.8 UA